US008905318B2

(12) United States Patent
Lee et al.

(10) Patent No.: US 8,905,318 B2
(45) Date of Patent: Dec. 9, 2014

(54) COMPOSITE TYPE MULTI-MODE ELECTRONIC SEAL

(71) Applicants: Chung Shan Institute of Science and Technology Armaments Bureau M. N. D, Longtan Township, Taoyuan County (TW); Customs Administration Ministry of Finance R. O. C., Taipei (TW)

(72) Inventors: Ming-Town Lee, Longtan Township, Taoyuan County (TW); Feng-Yu Chang, Longtan Township, Taoyuan County (TW); Tung-Jung Hsu, Longtan Township, Taoyuan County (TW); Wei-Yi Tseng, Longtan Township, Taoyuan County (TW)

(73) Assignees: Chung Shan Institute of Science and Technology, Armaments Bureau, M.N.D, Taoyuan County (TW); Customs Administration, Ministry of Finance, R.O.C., Taipei (TW)

( * ) Notice: Subject to any disclaimer, the term of this patent is extended or adjusted under 35 U.S.C. 154(b) by 175 days.

(21) Appl. No.: 13/731,853

(22) Filed: Dec. 31, 2012

(65) Prior Publication Data
US 2014/0183266 A1    Jul. 3, 2014

(51) Int. Cl.
*G06K 19/06*     (2006.01)
*G06K 19/077*    (2006.01)
*B65D 90/00*     (2006.01)
*E05B 45/06*     (2006.01)

(52) U.S. Cl.
CPC .......... *G06K 19/07758* (2013.01); *B65D 90/00* (2013.01); *E05B 45/06* (2013.01)

USPC .......................................... 235/492; 235/486

(58) Field of Classification Search
CPC ......... E05B 39/02; E05B 39/04; E05B 45/04; E05B 45/12; G09F 3/0317; G09F 3/0358; G09F 3/0335; G09F 3/0376; G09F 3/0329; G07C 9/00896; G08B 13/126
USPC .......................... 235/492, 486, 487, 449, 493
See application file for complete search history.

(56) References Cited

U.S. PATENT DOCUMENTS

| | | | |
|---|---|---|---|
| 2006/0087431 A1* | 4/2006 | Shieh et al. | 340/572.1 |
| 2006/0145868 A1* | 7/2006 | Chen et al. | 340/572.8 |
| 2006/0202824 A1* | 9/2006 | Carroll et al. | 340/568.1 |
| 2008/0117058 A1* | 5/2008 | Oberle | 340/572.8 |
| 2009/0121877 A1* | 5/2009 | Henderson | 340/572.7 |
| 2009/0121878 A1* | 5/2009 | Lai | 340/572.7 |
| 2010/0214077 A1* | 8/2010 | Terry et al. | 340/10.4 |

* cited by examiner

*Primary Examiner* — Thien M Le
(74) *Attorney, Agent, or Firm* — Chun-Ming Shih

(57) ABSTRACT

A composite type multi-mode electronic seal includes the bolt, the bolt male pedestal and the communication control part, and the advantage of the composite type multi-mode electronic seal containing the passive electronic seal containing the bolt and the bolt male pedestal and the active electronic seal containing bolt, the bolt male pedestal and the communication control part. Thereby, the present invention has the advantages and preferred result of the active and passive electronic seal, and can help the container cars, bonded cars, trucks and the like to perform the goods transmission, and it still perform the data read and data report according to the different RFID identification equipments built by every country's custom so to achieve the purpose of effectively recording the broken elements, instantly reporting and preventing smuggling.

9 Claims, 4 Drawing Sheets

COMPOSITE TYPE MULTI-MODE ELECTRONIC SEAL

BACKGROUND OF THE INVENTION

1. Field of the Invention

The present invention relates to a composite type multi-mode electronic seal, and more particularly, to a composite type multi-mode electronic seal combining a passive electronic seal with an active electronic seal.

2. Description of the Related Art

Nowadays, 85% of global trading goods are transported through locked transportation containers; wherein the containers transited through sea transportation, duty-bonded trucks and freight trains are the main streams.

Tradition container transportation uses mechanical type container seal at the door latch of the container to seal the container, and prints barcode at one side of the mechanical type container seal to allow custom officers to check the barcode and compare whether the barcode matches the customs form. However the mechanical type container seal is easy to damage and copy so as to generate smuggling problems.

Because of the disadvantage of the mechanical type container seal, the container seal is developed to electronic container seal in recent years. The radio frequency identification (RFID) chip is built in the mechanical type container seal for allowing the RFID reader to read the barcode of the electronic container seal so as to prevent the container smuggling, easy copy or damage the barcode of the mechanical type container seal. The electronic container seal used on transportation containers may be classified as active electronic seals and passive electronic seals according to whether there exists an extra battery supplying power to the RFID chip. The active electronic seal has complicated internal structures and high manufacturing cost, and generally will be recycled for reuse accordingly. Since the active electronic seal has an extra battery supply power, warning signals may be sent automatically during unauthorized open operation or damages. As to the passive electronic seal, since the structure is relatively simple and there is no extra battery supplying extra power, the operating principle is to receive the electromagnetic power transmitted from external RFID readers, stimulate the RFID chip inside the passive electronic seal, and then use the received electromagnetic power to transmit identification data of RFID chip backwards as a responded electromagnetic signal, thereby facilitating a data exchanging operation.

However, no matter the active or passive electronic container seal, because the different countries have different read equipments and spans (some countries use the active electronic container seal, the others use the passive electronic seal), it will causes the read commonness of both are inconsistent so as to limit the convenience of container on the multinational transportation, and is not conjunction with the actual work operation.

Accordingly, a composite type electronic seal for solving the aforementioned problems is needed.

SUMMARY OF THE INVENTION

In view of the foregoing, it is an object of the present invention to provide a the composite type multi-mode electronic seal comprising the bolt, the bolt male pedestal and the communication control part, and the composite type multi-mode electronic seal contains advantages and functions of the passive electronic seal and the active electronic seal, and when the container cars, bonded cars, trucks and the like transmit the goods, it still perform the data read and data report according to the different RFID identification equipments built by every country's custom so as to achieve the purpose of effectively recording the broken elements, instantly reporting and preventing smuggling.

For achieving the object above, a composite type multi-mode electronic seal, comprising: a bolt, having a plurality of connection pins, and the plurality of connection pins electrically combined with a transmission line, and the transmission line electrically combined with a wireless RFID module and a wireless RFID transmission antenna; a bolt male pedestal, for inserting the bolt, the bolt male pedestal having a C-shaped retaining ring, and the bolt is tightly locked by the C-shaped retaining ring to form a passive electronic seal; and a communication control part, having an insulation plastic shell and a bolt female pedestal used for combining the bolt male pedestal with the bolt female pedestal, and the bolt female pedestal having a bolt connection pin matching and combining to the plurality of connection pins, and one side of the communication control part clasped to one terminal of a clasp module, and another terminal of the clasp module electrically combined with a control and communication module, and the control and communication module electrically combined with a power module to combine the bolt and the bolt male pedestal with the bolt female pedestal of the communication control part to form the composite type multi-mode electronic seal.

In the present invention, the control and communication module comprising automatic detection and obtaining power from a battery is combined with the passive electronic seal without power to form the composite type multi-mode electronic seal to advance the high safety and flexibility. Further, the active electronic seal and the passive electronic seal are used singly or in combination, and the passive and the active electronic seals respectively has a electrical loop signal to detect and safely decode each other, and a bolt connection pin of a communication control part is match and combined with a plurality of connection pins of a bolt to form a safe decoded-confirmed electrical loop signal, and when the safe decoded-confirmed electrical loop signal is broken, the communication control part automatically transmits a warning information, and when a bolt with a bolt male pedestal are separated from a bolt female pedestal a clasp module of the active electronic seal instantly detecting a separated signal to confirm whether the active electronic seal is clasped.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
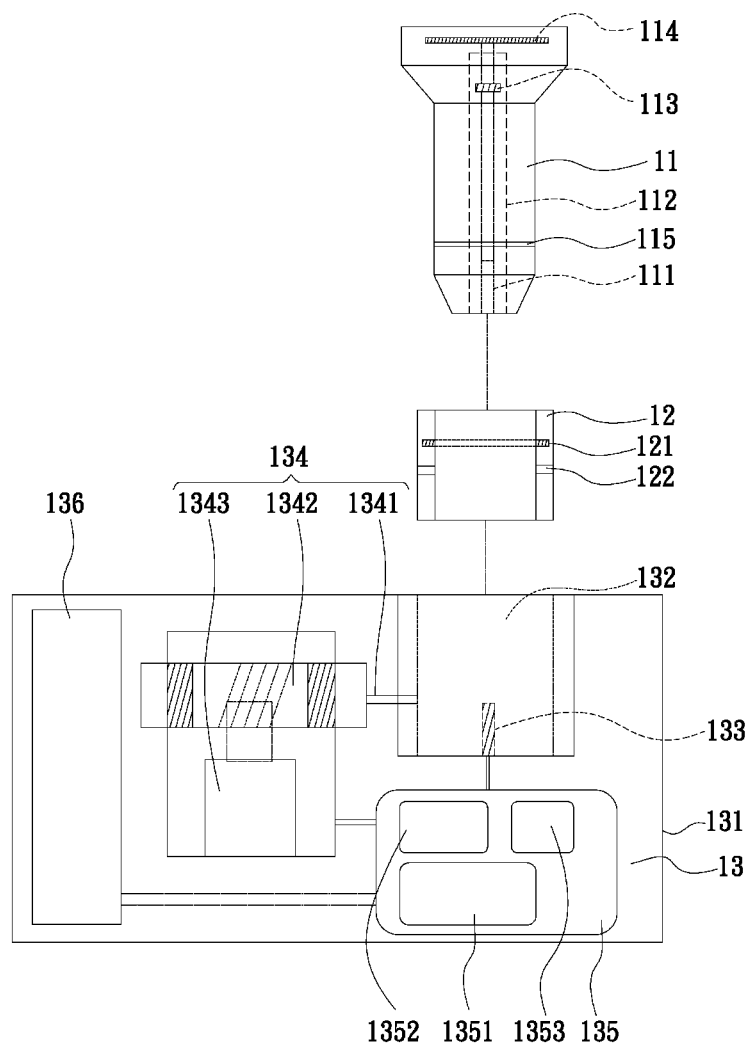
FIG. 1 illustrates a structure diagram of the composite type multi-mode electronic seal of the present invention.

Reference will now be made to the drawings to describe exemplary embodiments of the present driving control system and method for visual evoked brain wave by multi-frequency phase encoder, in detail. The following description is given by way of example, and not limitation.

Referring to FIG. 1 through FIG. 4, illustrating structure diagram and operation diagram of composite type multi-mode electronic seal of the present invention. The composite type multi-mode electronic seal comprises a bolt 11, a bolt male pedestal 12 and a communication control part 13.

The bolt 11 has a plurality of connection pins, and the plurality of connection pins are electrically combined with a transmission line 112, and the transmission line 112 is electrically combined with a radio frequency (RFID) module 113 and a RFID transmission antenna 114 to form a passive electronic seal with a RFID identification circuit. The bolt male pedestal 12 is used for inserting the bolt 11, and the bolt male pedestal 12 has a C-shaped retaining ring 121, and the bolt 11 is tightly locked by the C-shaped retaining ring 121, and the bolt 11 locked is combined with the passive electronic seal with a RFID identification circuit to form the passive electronic seal.

The communication control part 13 has an insulation plastic shell 131 and a bolt female pedestal 132, and the bolt female pedestal 132 is used for clasping the bolt male pedestal 131, and a bolt connection pin 133 is mounted in the bolt female pedestal 132, and used for combining to the plurality of connection pins 111, and one side of the female pedestal 132 is clasped to one side of a clasp module 134, and the another side of the clasp module 134 is electrically combined with a control and communication module 135, the control and communication module 135 is combined with a power module 136 so as to insert the bolt 11 and the bolt male pedestal 12 to the bolt female pedestal 132 in the communication control part 13 to form an active electronic seal. Thereby, the passive electronic seal and the active electronic seal are combined to a composite type multi-mode electronic seal of the present invention.

In the embodiment, material of the bolt is metal, and outside of the metal is covered by a plastic shell (not shown in) to perform the protection. A first annular groove 115 is mounted in the end terminal of the bolt 11, and the bolt 11 is inserted in the bolt male pedestal 12, and the bolt male pedestal 12 is clasped to the first annular groove 115 by the C-shaped retaining ring 121. Thereby, the bolt 11 is tightly clasped locked, and also to turn on the RFID module 113 and the RFID transmission antenna 114 to enable the electronic seal.

In the embodiment, a second annular groove 122 is mounted in the end terminal of the bolt male pedestal 12. The bolt 11 is combined with the bolt male pedestal 12, and then the bolt male pedestal 12 is combined with the bolt female pedestal 132 of the communication control part 13. Thereby, one side of the clasp module 134 is clasped to the second annular groove 122.

In the embodiment, the clasp module 134 comprises a crescent rail 1341, a clasp pedestal 1342 and a motor 1343. One side of the crescent rail 1341 is clasped to the second annular groove 122, and another side of the crescent rail 1341 is couple to one side of the clasp pedestal 1342, and central portion of the clasp pedestal 1342 is combined with the rotation shaft. In the embodiment, the communication control module 135 comprises a voltage converting unit 1351, a remote communication unit 1352 and a satellite positioning unit 1353. The voltage converting unit 1351 is combined with the power module 136 so as to convert the power provided by the power module 136, and the power provided is transmitted to every element in the composite type multi-mode electronic seal.

Figure 4:
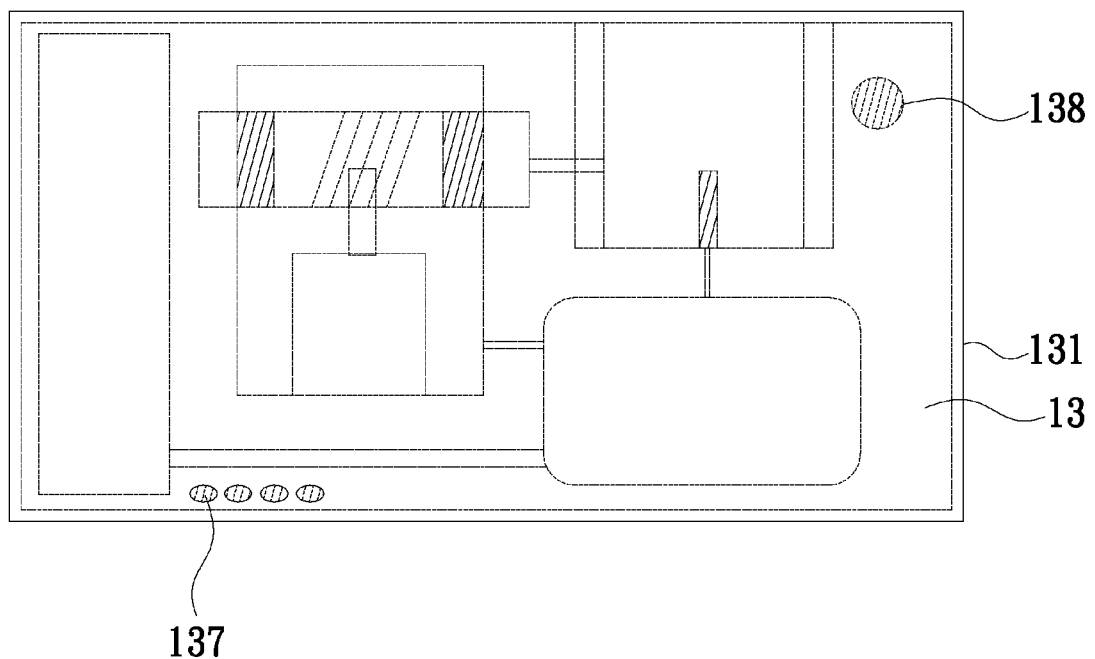

In the embodiment, the communication control part 13 further comprises a display and warning module 137 (as shown in FIG. 4), and the display and warning module 137 is electrically combined with the control and communication module 135 to perform the information display and warning.

In the embodiment, the communication control part 13 further comprises a safety switch module 138 (as shown in FIG. 4), the safety switch module 138 is electrically combined with the communication module 135 to receive a command signal with encryption technology to perform the encryption for the composite type multi-mode electronic seal.

Figure 2:
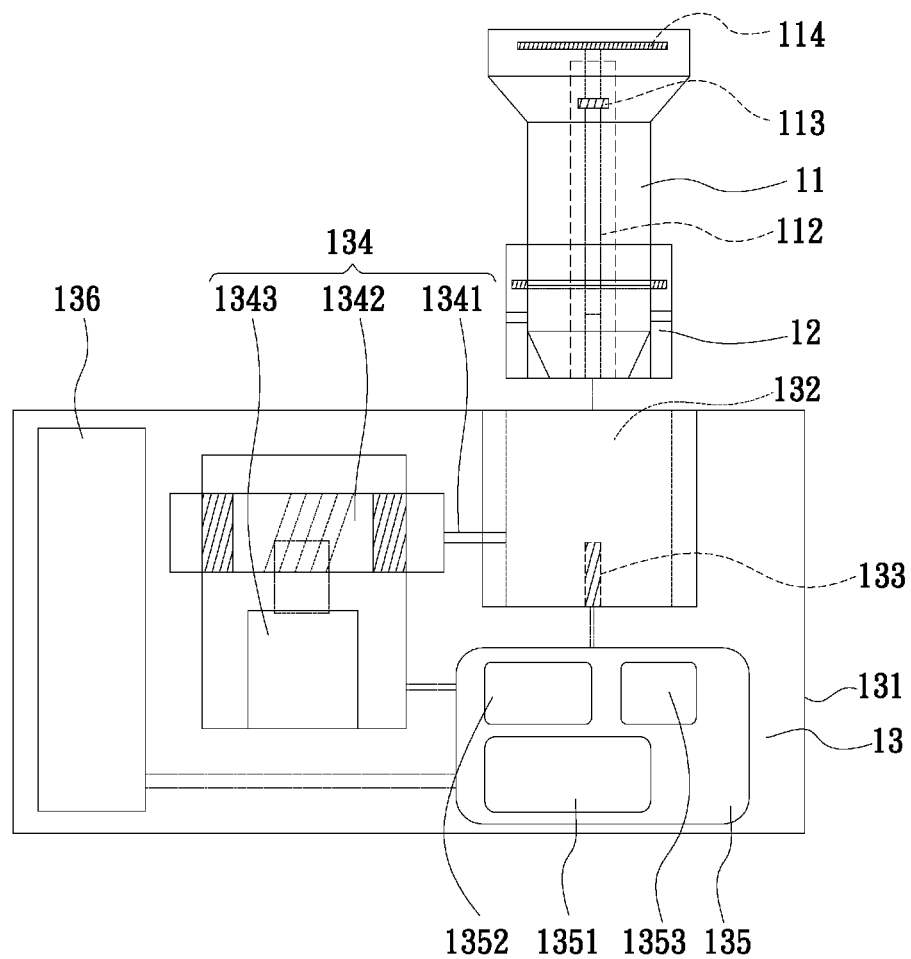
FIGS. 2-4 illustrate operation diagrams of the composite type multi-mode electronic seal of the present invention.
Figure 3:
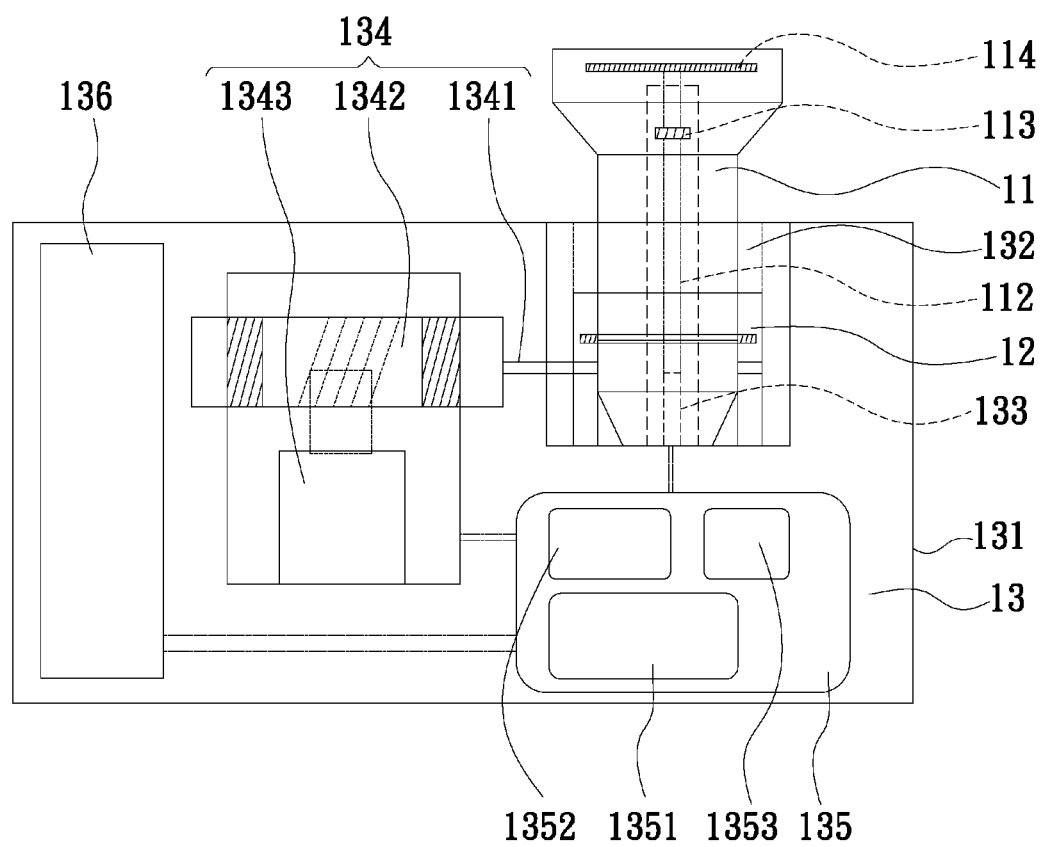

When container cars, bonded cars, trucks and the like are sealed and locked, the bolt 11 passes through to the retaining ring mounted in the container or cabin of cars (not shown in) and is clasped to the bolt male pedestal 12, and the bolt male pedestal 12 is combined with the first annular groove 115 of the blot 11 by the C-shaped retaining ring 121 to form the passive electronic seal (as shown in FIG. 2), and bolt 11 combined with the bolt male pedestal 12 is inserted into the bolt female pedestal 132 of the communication control part 13 so as to match the plurality of connection pins 111 in the bolt 11 to the bolt connection pins 133 in the bolt female pedestal 132. After the plurality of connection pins 111 are electrically combined with the bolt connection pins 133, the remote communication unit 1352 in the communication control 13 is turn on and triggered to achieve function of the active electronic seal. A external encryption command signal transmitted from the external stationary or hand-held wireless RFID reader, and the remote communication unit 1352 of the communication control part 13 receives the external encryption command signal to generate a sealed command to drive the motor 1343 of the clasped module 134 so as to positive rotate the clasped pedestal 1342 to move the crescent rail 1341 toward to the bolt male pedestal 12, and the crescent rail 1341 is clasped to the second annular groove 122, and the bolt male pedestal 12 is tightly clasped to the bolt female pedestal 132. The power of the motor 1343 is cut by the control and communication module 135.

When the remote communication unit 1352 receives the external encryption command signal, the voltage convert unit 1351 of the control and communication module 135 converts the power stored in the power module 136 and the power is proved to the every element in the composite type multi-mode electronic seal. When the plurality of connection pins 111 are matched and combined with the bolt connection pins 133, the wireless RFID module 113 and the wireless RFID transmission antenna 114 in the bolt 11 are combined with the transmission line 112 and the power module 136 of the communication control part 13 to form a loop to form a safety clasp detection loop of the active electronic seal.

If the bolt 11 suffers from the external force failure of the human, the destructive time and breakdown element of the composite type multi-mode electronic seal are recorded by the control and communication module 135 of the communication part 13, and the destructive time and breakdown element are recorded in the memory unit (not shown in) of the control and communication module 135, and it performs warning by the display and warning module 137 of the communication control part 13. Beside, the memory unit of the control and communication module 135 is used for performing the record storage, the RFID reader may reads the information in the composite type multi-mode electronic seal, and the destructive information is also read for allowing the customs officer or container owner to enable the risk mechanism. In actual operation, the destructive time and breakdown element of the composite type multi-mode electronic seal are transmitted out by the remote communication unit 1352.

When the composite type multi-mode electronic seal was unsealed, the external wireless RFID reader transmits a RFID electromagnetic to read an unique identification code and information of the safety and transportation recorded in the wireless RFID module 113, and it performs information transmission by the wireless RFID transmission antenna 114, and the external RFID reader transmits a encryption command signal after the identification is correct, and the remote communication unit 1352 of the control and communication module 135 receives the encryption command signal and the control and communication module 135 decodes the encryption command signal to generate a unsealed command to the safety switch module 138, and the safety switch module 138 is pressed at same time (not shown in). The control and communication module 135 drive the motor to perform the negative rotation to move the clasp pedestal 1342. Thereby, the crescent rail 1341 is separated from the second annular groove 122 for allowing the bolt male pedestal 12 separating from the bolt female pedestal 132, and the power of the motor 1343 is cut by the control and communication module 135, and therefore, and then the bolt 11 is cut by tools to separate from the bolt male pedestal 12. This process is the decode process of the composite type multi-mode electronic seal, and therefore the container cars, bonded cars and trucks and the like can perform the container opened operation.

Regarding to multinational companies or span transmission, when the composite type multi-mode electronic seal was unsealed, the external wireless RFID reader transmits a RFID electromagnetic to read an unique identification code and information of the safety and transportation recorded in the wireless RFID module 113, and it performs information transmission by the wireless RFID transmission antenna 114, and the external RFID reader transmits a encryption command signal after the identification is correct, and the remote communication unit 1352 of the control and communication module 135 receives the encryption command signal and the control and communication module 135 decodes the encryption command signal to generate a unsealed command to the safety switch module 138, and the safety switch module 138 is pressed at same time (not shown in). The control and communication module 135 drive the motor to perform the negative rotation to move the clasp pedestal 1342. Thereby, the crescent rail 1341 is separated from the second annular groove 122 for allowing the bolt male pedestal 12 separating from the bolt female pedestal 132, and the communication part of the active electronic seal can be taken. This process is the decode process of the composite type multi-mode electronic seal, but the bolt 11 combined with the bolt male pedestal 12 will not be damage (for example, cut), and therefore, the passive electronic seal decoded is maintained till it reached the destination.

The composite type multi-mode electronic seal consists of the passive electronic seal and the active electronic seal, and it the electrical loop signal to perform the detection each other. Therefore, when the composite type multi-mode electronic seal is clasped to the retaining ring of the container cars, bonded cars and trucks and the like, the composite type multi-mode electronic seal is combined with the external stationary or hand-held wireless RFID reader to read an unique identification code and transmit the information of the dual safety and transportation according to different read equipments and sizes built by the different countries. Therefore, the composite type multi-mode electronic seal suffers from the external force failure during the transmission process—whatever the transmission line 112 between the bolt 11 and the bolt male pedestal 12 is damaged in part or all, the control and communication module 135 in the communication control part 13 will detect the voltage change of the composite type multi-mode electronic seal, and the record the voltage change time of the composite type multi-mode electronic seal of the present invention in the memory unit (not shown in) of the control and communication module 135. Even the transmission line 12 is electrified again, the voltage change time of the composite type multi-mode electronic seal broken is recorded in the memory unit (not shown in) in the control and communication module 135, and the voltage change time is read out by the external stationary or hand-held wireless RFID reader, and the customs officer or container owner can know when the container cars, bonded cars, trucks and the like suffer form the external force failure so as to perform related damage operation to decrease the damage.

Moreover, the container cars, bonded cars, trucks and the like can be located by the GPS location technology during the transmission process, and the satellite location information of the container cars, bonded cars, trucks and the like is returned to the control and communication module 135, and the communication module 135 records and applies the satellite location information. And the satellite location information is also transmitted by the remote communication unit 1342 for instantly reporting the location to help visually entire monitor operation, and the remote communication unit 1352 provides a telecommunications communication network package protocol to transmit the safety information and good information, and the telecommunication communication network package protocol comprises GPRS, WDCDMA and HSDPA, and these telecommunications communications are used to instantly exchange and report the remote dual information.

Additionally, in the composite type multi-mode electronic seal of the present invention, when the power of the power module 136 in the communication control part 13 is not enough, the display and warning module 137 will perform the display and warning.

Therefore, the composite type multi-mode electronic seal comprises the bolt 11, the bolt male pedestal 12 and the communication control part 13, and the composite type multi-mode electronic seal contains advantages and functions of the passive electronic seal and the active electronic seal, and when the container cars, bonded cars, trucks and the like transmit the goods, it still perform the data read and data report according to the different RFID identification equipments built by every country's custom so to achieve the purpose of effectively recording the broken elements, instantly reporting and preventing smuggling.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A composite type multi-mode electronic seal, comprising:
   a bolt, having a plurality of connection pins, and the plurality of connection pins electrically combined with a transmission line, and the transmission line electrically combined with a wireless RFID module and a wireless RFID transmission antenna;
   a bolt male pedestal, for inserting the bolt, the bolt male pedestal having a C-shaped retaining ring, and the bolt is tightly locked by the C-shaped retaining ring to form a passive electronic seal; and
   a communication control part, having an insulation plastic shell and a bolt female pedestal used for combining the bolt male pedestal with the bolt female pedestal, and the bolt female pedestal having a bolt connection pin matching and combining to the plurality of connection pins, and one side of the communication control part clasped to one terminal of a clasp module, and another terminal of the clasp module electrically combined with a control and communication module, and the control and communication module electrically combined with a power module to combine the bolt and the bolt male pedestal with the bolt female pedestal of the communication control part to form the composite type multi-mode electronic pedestal.

2. The composite type multi-mode electronic seal of claim 1, wherein material of the bolt is metal, and outside of the metal is covered by the plastic shell, and a first annular groove mounted in end terminal of the bolt is used for inserting the bolt, and the bolt is combined with the first annular groove by the C-shaped retaining ring for tightly locking the bolt.

3. The composite type multi-mode electronic seal of claim 1, wherein a second annular groove is mounted outside of the bolt male pedestal, and after the bolt is combined with the bolt male pedestal, the bolt male pedestal is combined with the bolt female pedestal of the communication control part, and one terminal of the clasp module is clasped to the second annular groove.

4. The composite type multi-mode electronic seal of claim 1, wherein the bolt is combined with the bolt male pedestal to form a passive electronic pedestal, and the bolt male pedestal is combined with the communication control part to form an active electronic pedestal, and the passive electronic pedestal is combined with an active electronic pedestal to respectively provide safety identification signals and perform the seal by the passive electronic seal.

5. The composite type multi-mode electronic seal of claim 1, wherein the clasp module comprises a crescent rail, a clasp pedestal and a motor, and one terminal of the crescent rail is clasped to the second annular groove, and another terminal of the second annular groove is combined with one side of the clasp pedestal, and central portion of the clasp pedestal is combined with the rotation shaft.

6. The composite type multi-mode electronic seal of claim 1, wherein the control and communication module comprises a voltage converting unit, a remote communication unit and a satellite positioning unit, and the voltage converting unit is combined with the power module, and the voltage converting unit converts power from the power module, and the power converted is provide to every element in the composite type multi-mode electronic seal.

7. The composite type multi-mode electronic seal of claim 1, wherein the communication control part further comprises a display and warning module, which is electrically combined with a control and communication module for providing data display and warning.

8. The composite type multi-mode electronic seal of claim 1, wherein the communication control part further comprises a safety switch module, which is electrically combined with the control and communication module for receiving a encryption command signal to decode the composite multi-mode electronic seal.

9. A composite type multi-mode electronic seal, the composite multi-mode electronic seal comprising a passive electronic seal, an active electronic seal, wherein the passive and the active electronic seals respectively has a electrical loop signal to detect and safety decode each other, and a bolt connection pin of a communication control part is match and combined with a plurality of connection pins of a bolt to form a safe decoded confirmed electrical loop signal, and when the safe decode confirmed electrical loop signal is broken, the communication control part automatically transmits a warning information, and when a bolt and a bolt male pedestal are separated from a bolt female pedestal, a clasp module of the active electronic seal instantly detecting a separated signal to confirm whether the active electronic seal is clasped.

* * * * *